US008865289B2

(12) United States Patent
Borchardt

(10) Patent No.: US 8,865,289 B2
(45) Date of Patent: Oct. 21, 2014

(54) INCREMENTALLY STRETCHED FILMS WITH INCREASED TEAR RESISTANCE AND METHODS FOR MAKING THE SAME

(75) Inventor: Michael G. Borchardt, Naperville, IL (US)

(73) Assignee: The Glad Products Company, Oakland, CA (US)

( * ) Notice: Subject to any disclaimer, the term of this patent is extended or adjusted under 35 U.S.C. 154(b) by 240 days.

(21) Appl. No.: 13/189,772

(22) Filed: Jul. 25, 2011

(65) Prior Publication Data

US 2013/0029066 A1  Jan. 31, 2013

(51) Int. Cl.
  B32B 1/02 (2006.01)
  B32B 3/00 (2006.01)
  B31F 1/26 (2006.01)
  B31B 1/00 (2006.01)
  B29C 55/18 (2006.01)
  B29C 55/06 (2006.01)
  B29C 55/02 (2006.01)

(52) U.S. Cl.
  CPC ........... B29C 55/18 (2013.01); *B31B 2237/406* (2013.01); B31F 1/26 (2013.01); *B29C 55/06* (2013.01); *B31B 2237/10* (2013.01); B31B 1/00 (2013.01); *B29C 55/023* (2013.01); *B31B 2219/88* (2013.01); *B31B 2219/9093* (2013.01); *B31B 2219/23* (2013.01)
  USPC ........ 428/156; 428/34.8; 428/35.2; 428/35.7; 428/141; 428/152; 428/155; 428/163; 428/167

(58) Field of Classification Search
  USPC ........... 428/34.1, 34.8, 34.9, 35.1, 35.2, 35.4, 428/35.5, 35.7, 36.4, 36.6, 36.7, 36.9, 428/36.91, 36.92, 141, 147, 152, 155, 156, 428/163, 167, 172, 173
  See application file for complete search history.

(56) References Cited

U.S. PATENT DOCUMENTS

| 4,116,892 | A | | 9/1978 | Schwarz | |
|---|---|---|---|---|---|
| 4,251,585 | A | * | 2/1981 | Schwarz | 428/188 |
| 5,626,944 | A | * | 5/1997 | Rasmussen | 428/172 |
| 6,264,864 | B1 | * | 7/2001 | Mackay | 264/154 |
| 6,952,510 | B1 | | 10/2005 | Karlsen et al. | |
| 2008/0178768 | A1 | | 7/2008 | Breese | |
| 2008/0233375 | A1 | | 9/2008 | Wright et al. | |
| 2009/0233041 | A1 | | 9/2009 | Rasmussen | |
| 2010/0040875 | A1 | | 2/2010 | Patel et al. | |
| 2011/0117307 | A1 | | 5/2011 | Fraser et al. | |

OTHER PUBLICATIONS http://www.mathsisfun.com/numbers/percentage-change.html, 4 pages, accessed Jul. 2, 2014.*

* cited by examiner

*Primary Examiner* — Walter B Aughenbaugh

(57) ABSTRACT

Methods of incrementally stretching thermoplastic films in the machine direction include elongating the films in the machine direction without reducing the films' machine-direction tear resistance. In one or more implementations, methods of incrementally stretching thermoplastic films include reducing the gauge of the films without reducing the films' machine-direction tear resistance. The methods can involve cold stretching the films and imparting transverse-direction extending linear rib pattern into the film. The linear ribs can have alternating thick and thin gauges. Incrementally stretched thermoplastic films can have a machine-direction tear resistance that is equal to or greater than the machine-direction tear resistance of the film prior to stretching.

24 Claims, 8 Drawing Sheets

INCREMENTALLY STRETCHED FILMS WITH INCREASED TEAR RESISTANCE AND METHODS FOR MAKING THE SAME

BACKGROUND OF THE INVENTION

1. The Field of the Invention

The present invention relates generally to thermoplastic films. Specifically, the invention relates to incrementally-stretched thermoplastic films, and methods thereof.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength of a thermoplastic film. The tensile strength of a thermoplastic film is the maximum stress that a film can withstand while being stretched before it fails. Another strength parameter that manufacturers may want to increase or otherwise control is tear resistance. The tear resistance of a thermoplastic film is the amount of force required to propagate or enlarge a tear that has already been created in a film. Still further, a manufacturer may want to increase or otherwise control a film's impact resistance.

One way manufacturers may attempt to control or change the material properties of a thermoplastic film is by stretching the film. Common directions of stretching include "machine direction" and "transverse direction" stretching. As used herein, the term "machine direction" refers to the direction along the length of the film, or in other words, the direction of the film as the film is formed during extrusion and/or coating. As used herein, the term "transverse direction" refers to the direction across the film or perpendicular to the machine direction.

Common ways of stretching film in the machine direction include machine direction orientation ("MDO") and incremental stretching. MDO involves stretching the film between two pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

To increase the MD tensile strength of a thermoplastic film, manufacturers commonly heat the film to an elevated temperature and stretch the film in the machine direction. If a film is not stretched by the correct amount, the tensile strength of the film may not increase. Commonly, manufacturers seeking to increase the tensile strength of a film will stretch the thermoplastic film between approximately 300 to 500 percent of the film's original length or more. Unfortunately, stretching thermoplastic films in the machine direction using conventional methods results in a reduction in the film's MD tear resistance, and a reduction in the film's overall puncture resistance.

One common use of thermoplastic films is as bags for liners in trash or refuse receptacles. It is desirable to have trash bags with a high tear resistance to help prevent tearing of the trash bag and associated spilling of the contents during disposal thereof. Another common use of thermoplastic films is as flexible plastic bags for storing food items. Similar to trash bags, a high tear resistance in food storage bags can help prevent tearing of the bags and associated spilling or spoiling of food.

Accordingly, there are a number of considerations to be made in thermoplastic films and manufacturing methods.

BRIEF SUMMARY OF THE INVENTION

Implementations of the present invention solve one or more problems in the art with apparatus and methods for incrementally stretching films in the machine direction without reducing the films' MD tear resistance. In particular, one or more implementations of the present invention include MD incrementally-stretched films, and products formed therewith, that have a maintained or increased MD tear resistance. Additionally, one or more implementations of the present invention include methods of incrementally-stretching films in the machine direction, while maintaining or increasing the films' MD tear resistance.

For example, one implementation of a thermoplastic film can include a set of linear ribs extending across the film in a direction transverse to a direction in which the film was extruded. The linear ribs can each have a first average thickness. The film can also include a set of stretched linear ribs extending across the film in the transverse direction. The stretched linear ribs can each be positioned between adjacent linear ribs. The stretched linear ribs can each have a second average thickness that is smaller than the first average thickness. The film can have an MD tear resistance equal to or greater than an MD tear resistance of a film of the thermoplastic material having a substantially uniform thickness approximately equal to the first average thickness.

Additionally, one or more implementations of the present invention include a method for incrementally stretching a film of thermoplastic material in the machine direction without reducing the MD tear resistance of the film. The method can involve providing a film of a thermoplastic material with a first MD tear resistance. The method can also include cold stretching the film incrementally in the machine direction. The incrementally cold stretched film can have a second MD tear resistance that is equal to or greater than the first MD tear resistance.

In addition to the forgoing, another method for incrementally stretching a film of thermoplastic material in the machine direction without reducing the MD tear resistance of the film can involve providing a film of a thermoplastic material with a first MD tear resistance. Additionally, the method can involve imparting a pattern of alternating thick and thin ribs into the film. The ribs of the pattern can be linear and can extend across the film in the transverse direction. The ribbed film can have a second MD tear resistance that is equal to or greater than the first MD tear resistance.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
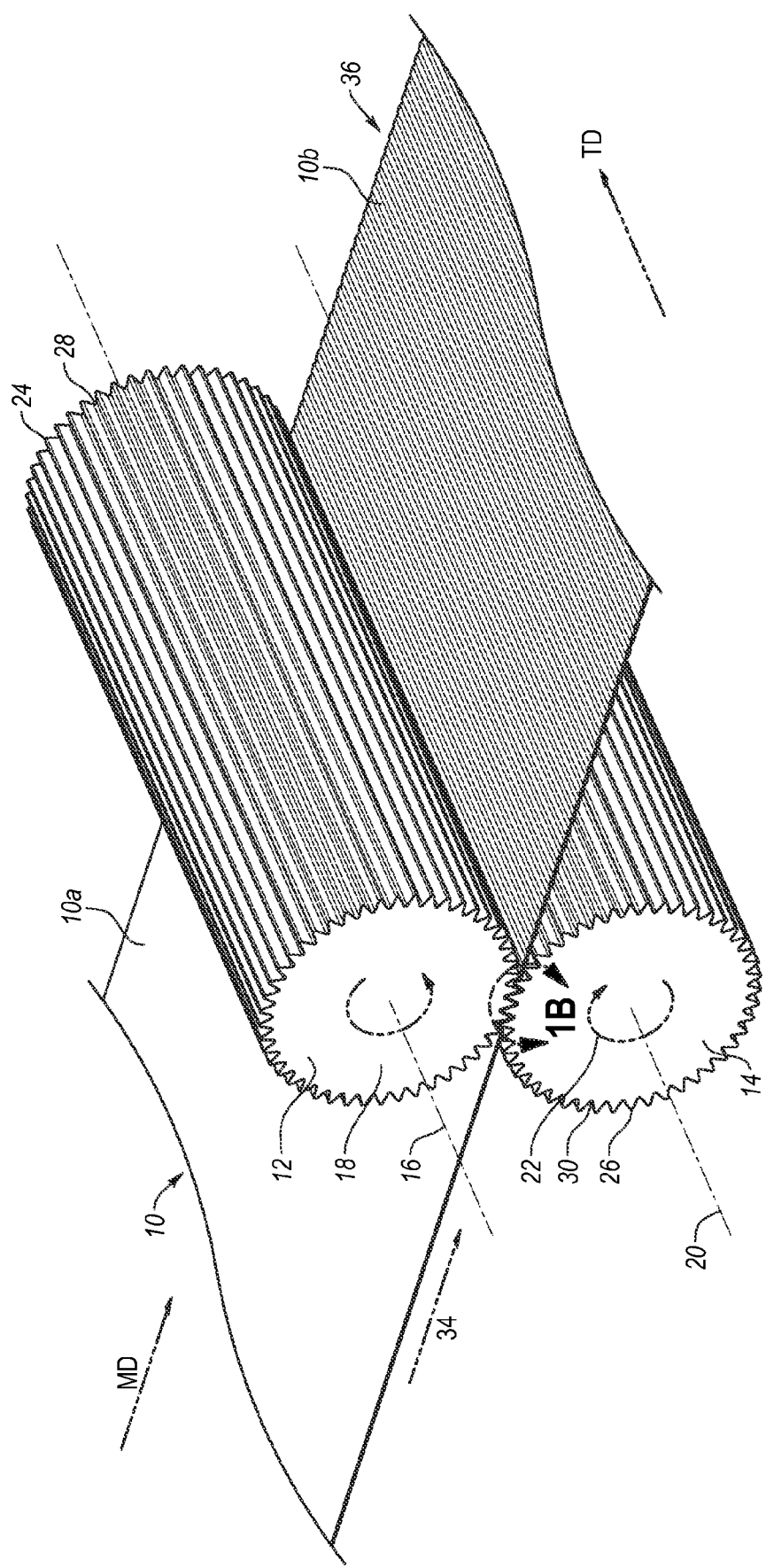
FIG. 1A illustrates a schematic diagram of a thermoplastic film being incrementally stretched in the machine direction in accordance with one or more implementations of the present invention.

One or more implementations of the present invention include apparatus and methods for incrementally stretching films in the machine direction without reducing the films' MD tear resistance. In particular, one or more implementations of the present invention include MD incrementally-stretched films, and products formed therewith, that have a maintained or increased MD tear resistance. Additionally, one or more implementations of the present invention include methods of incrementally-stretching films in the machine direction, while maintaining or increasing the films' MD tear resistance.

Indeed, one or more implementations of the present invention can provide thermoplastic films, and products made there from, with reduced gauge yet maintained or increased MD tear resistance. Thus, one or more implementations can reduce the material needed to produce a product without compromising important material properties, such as tear and puncture resistance. One will appreciate in light of the disclosure herein that such material reductions can provide significant cost savings.

In addition to the foregoing, one or more implementations provide stretched thermoplastic films with physical features that consumers can associate with the improved strength properties. In particular, one or more implementations include thermoplastic films with ribs extending across the film in the transverse direction. The ribs can serve to notify a consumer that the thermoplastic film has been processed to increase the strength of the film.

Some consumers may associate thinner films with decreased strength. Indeed, such consumers may feel that they are receiving less value for their money when purchasing thermoplastic film products with smaller gauges. One will appreciate in light of the disclosure herein that a consumer may not readily detect that one or more incrementally stretched films of the present invention have a reduced gauge. In particular, by imparting an alternating pattern of thick and thin ribs, the consumer may associate the thickness of the thermoplastic film with the thicker ribs.

As alluded to previously, one or more implementations include methods of incrementally stretching a film in the machine direction with the unexpected result of maintaining or increasing the MD tear resistance of the film. In particular, as will be described in greater detail below, one or more implementations provide synergistic effects when incrementally cold-stretching thermoplastic films in the machine direction. Indeed, the films of the present invention can undergo one or more film stretching processes under ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. This, in combination with determining the amount of stretch based on one or more of the polymer type, the starting gauge, and the blow up ratio, can provide the unexpected result of maintaining or increasing the MD tear resistance of the film.

Film Materials

As explained in greater detail below, the amount of MD incremental stretch needed to achieve the unexpected result of a maintained or increased MD tear resistance can be based, at least in part, on the thermoplastic material of the film being stretched. As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

Rubber-like polymers may also be employed and they are generally referred to herein as metallocene polymers or polyolefins produced from single-site catalysts. The some preferred catalysts are known in the art as metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene), and/or polyolefin terpolymers thereof. It can be suitable to blend into the resin a suitable amount of a cling agent, such as polyisobutylene, to control the level of lamination during the lamination process. Other suitable elastomers include propylene-based elastomers.

The examples and description herein below refer to films formed from linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material which may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to the foregoing, one will appreciate in light of the disclosure herein that manufacturers may form the films or webs to be used with the present invention using a wide variety of techniques. For example, a manufacturer can form the films using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference. Examples of various extruders, which can be used in producing the films to be used with the present invention, can be a single screw type modified with a blown film die, an air ring, and continuous take off equipment.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio" (BUR). As explained in greater detail below, in one or more implementations, the amount of MD incremental stretch to achieve the unexpected result of a maintained or increased MD tear resistance can be based, at least in part, on the BUR of the film being stretched.

Additionally or alternatively, in one or more implementations the amount of MD incremental stretch to achieve a maintained or increased MD tear resistance can be based, at least in part, on the starting gauge of the film being stretched. As used herein, the term "starting gauge" or "initial gauge" refers to the average distance between the major surfaces of a film before it is incrementally stretched. The films of one or more implementations of the present invention can have a starting gauge between about 0.1 mils to about 10 mils, suitably from about 0.2 mils to about 4 mils, suitably in the range of about 0.3 mils to about 2 mils, suitably from about 0.6 mils to about 1.25 mils, and suitably from about 0.9 mils to about 1.1 mils.

Figure 1B:
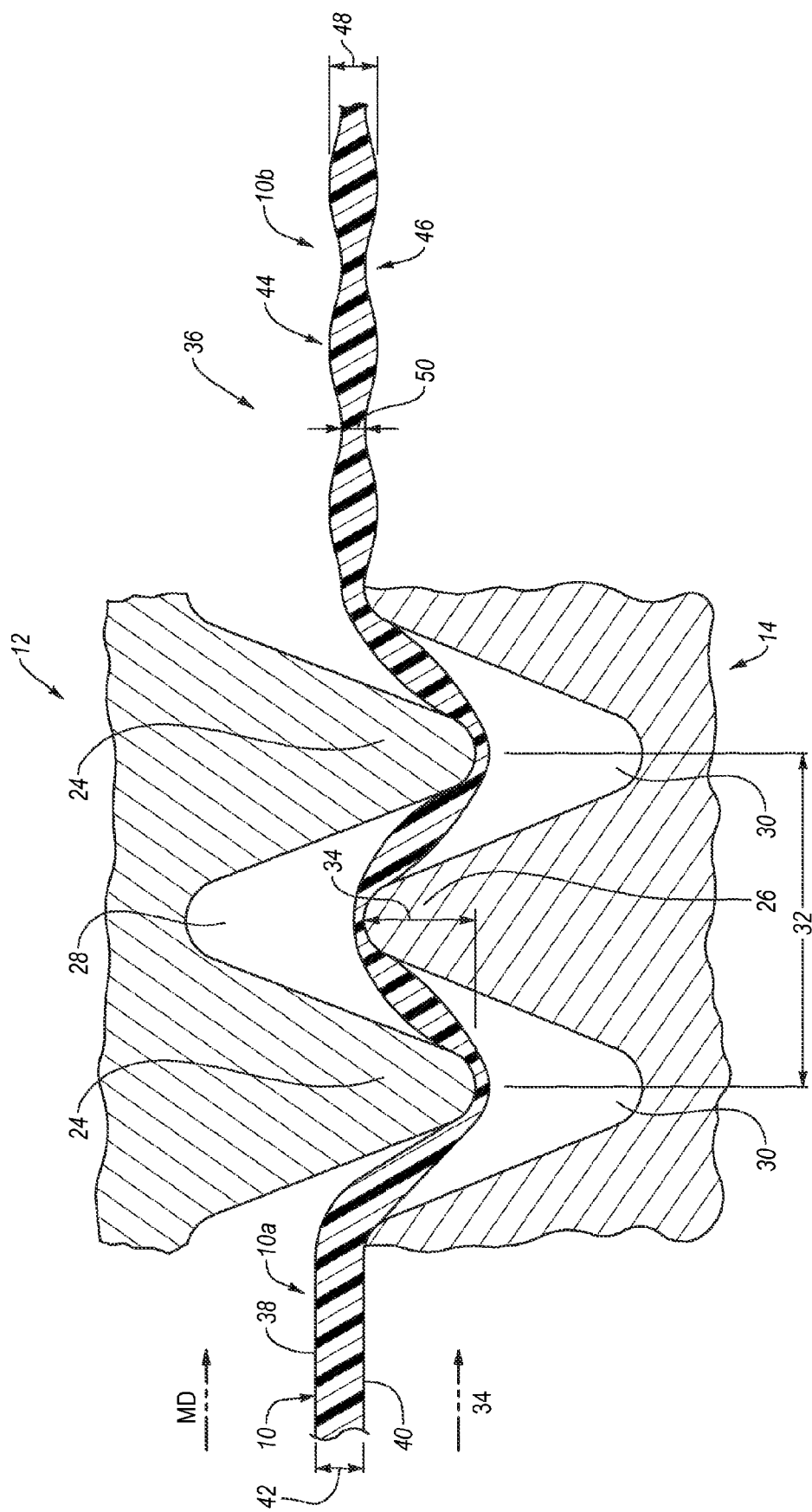
FIG. 1B illustrates an enlarged view of a portion of the thermoplastic film passing through the intermeshing rollers of FIG. 1A taken along the circle 1B of FIG. 1A.

Referring now to the Figures, FIGS. 1A and 1B illustrate one exemplary process of incrementally stretching a thermoplastic film in the machine direction in accordance with an implementation of the present invention. In particular, FIGS. 1A and 1B illustrate an MD ring rolling process that incrementally stretches a thermoplastic film 10 by passing the film 10 through a pair of intermeshing rollers 12, 14. As explained in greater detail below, the MD ring rolling processes of the present invention can stretch the film 10 in the machine direction, while maintaining or increasing the MD tear resistance of the film 10.

As shown by the Figures, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite direction about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22. The axes of rotation 16, 20 can be parallel to the transverse direction and perpendicular to the machine direction.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. FIGS. 1A and 1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14 as the rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount stretch a film passing through the intermeshing rollers 12, 14 undergoes.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different rollers 12, 14 during intermeshing. The ratio of DOE 34 to pitch 32 can determine, at least in part, the amount of stretch imparted by a pair of intermeshing rollers 12, 14.

As shown by FIG. 1A, the direction of travel 34 of the film 10 through the intermeshing rollers 12, 14 is parallel to the machine direction and perpendicular to the transverse direction. As the thermoplastic film 10 passes between the intermeshing rollers 12, 14, the ridges 24, 26 can incrementally stretch the film 10 in the machine direction. Stretching the film 10 in the machine direction can reduce the gauge of the film and increase the length of the film 10. Furthermore, in some implementations, stretching the film 10 in the machine direction can reduce the width of the film 10. For example, as the film 10 is lengthened in the machine direction, the film's length can be reduced in the transverse direction.

In particular, as the film 10 proceeds between the intermeshing rollers 12, 14, the ridges 24 of the first roller 12 can push the film 10 into the grooves 30 of the second roller 14 and vice versa. The pulling of the film 10 by the ridges 24, 26 can stretch the film 10. The rollers 12, 14 may not stretch the film 10 evenly along its length. Specifically, the rollers 12, 14 can stretch the portions of the film 10 that contact the ridges 24, 26 more than the portions of the film 10 that do not contact the ridges 24, 26. Thus, the rollers 12, 14 can impart or form a ribbed pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

As shown in FIGS. 1A and 1B, the ribbed pattern 36 formed by the MD ring rolling process can be visually perceivable. As used herein, the term "visually perceivable" refers to features that are readily discernible to the normal naked eye. In particular, visually perceivable features can be readily discernible to the normal naked eye when a film 10 including the features is subjected to normal use.

In one or more implementations, prior to passing through the intermeshing rollers 12, 14, the film 10 may not include a visually perceivable ribbed pattern. For example, FIGS. 1A and 1B illustrate that the pre-stretched film 10a (i.e., the film that is yet to pass through the intermeshing rollers 12, 14) can have a substantially flat top surface 38 and substantially flat bottom surface 40. The pre-stretched film 10a can have an initial thickness or starting gauge 42 extending between its major surfaces (i.e., the top surface 38 and the bottom surface 40). In at least one implementation, the starting gauge 42 can be substantially uniform along the length of the pre-stretched film 10a.

For purposes of the present invention, the pre-stretched film 10a need not have an entirely flat top surface 38. Indeed, the top surface 38 can be rough or uneven. Similarly, bottom surface 40 of the pre-stretched film 10a can also be rough or uneven. Further, the starting gauge 42 need not be consistent or uniform throughout the entirety of pre-stretched film 10a. Thus, the starting gauge 42 can vary due to manufacturing defects, tolerances, or other processing.

In any event, FIGS. 1A and 1B illustrate the intermeshing rollers 12, 14 can process the pre-stretched film 10a into an MD incrementally-stretched film 10b. As previously mentioned, the MD incrementally-stretched film 10b can include a ribbed pattern 36. The ribbed pattern 36 can include alternating series of thicker sections or ribs 44 and thinner sections or ribs 46. The ribs 44, 46 can extend across the MD incrementally-stretched film 10b in the transverse direction.

The thicker ribs 44 can have a first average thickness or gauge 48. The first average gauge 48 can be approximately equal to the starting gauge 42. In one or more implementations, the first average gauge 48 can be less than the starting gauge 42. The thinner ribs 46 can have a second average thickness or gauge 50. The second average gauge 50 can be less than both the starting gauge 42 and the first average gauge 48.

One will appreciate in light of the disclosure herein that the ribbed pattern 36 may vary depending on the method used to incrementally stretch the film 10. To the extent that MD ring rolling is used to incrementally stretch the film 10, the ribbed pattern 36 on the film 10 can depend on the pitch 32 of the ridges 24, 26, the DOE 34, and other factors. In some implementations, the molecular structure of the thermoplastic material of the film 10 may be rearranged to provide this shape memory.

As alluded to earlier, the MD tear resistance of the MD incrementally-stretched film 10b can be based at least on part on the ratio of DOE to pitch. Furthermore, the ratio of DOE to pitch that will maintain or increase the MD tear resistance of a particular film can be based on one or more of the thermoplastic material of the film, the starting gauge of the film, and the BUR used to form the film. The following examples present the results of a series of tests performed on thermoplastic films that have been incrementally stretched in the machine direction. These examples are illustrative of the invention claimed herein and should not be construed to limit in any way the scope of the invention.

Comparative Example 1

Figure 2:
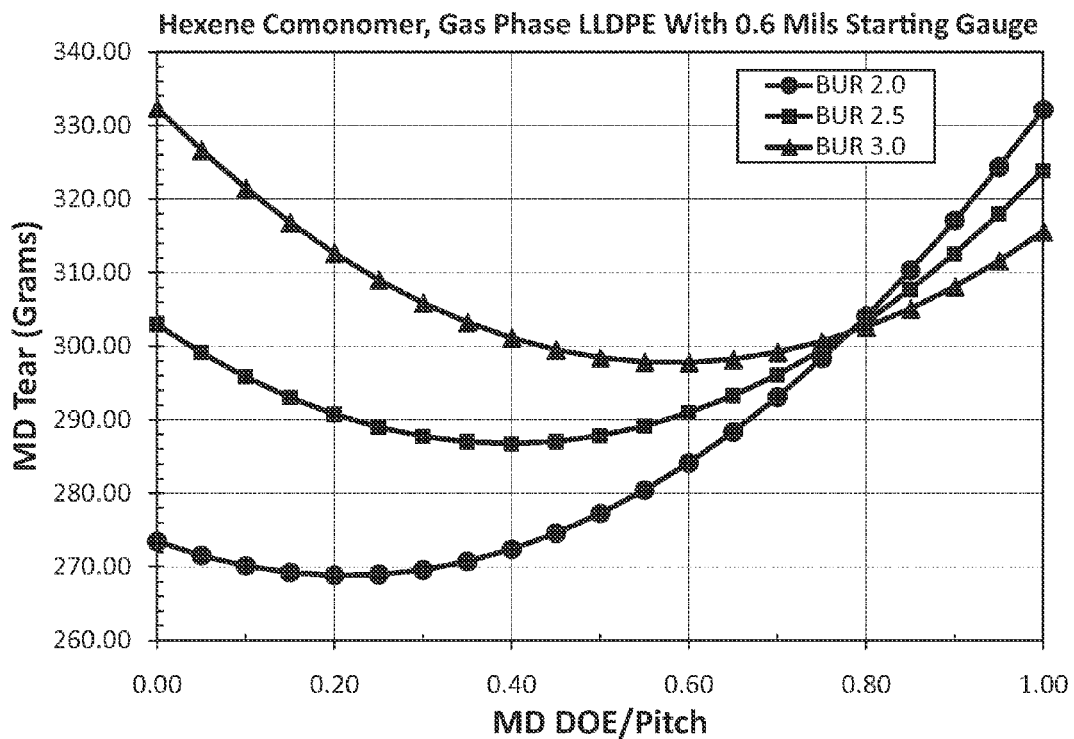
FIG. 2 is a chart that graphs, for three specific thermoplastic films having different blow-up ratios, the relationship between the ratio of depth-of-engagement to pitch and MD tear resistance in accordance with one or more implementations of the present invention.

In a first comparative example, three mono-layer films were MD incrementally stretched using a cold MD ring rolling process similar to that described herein above. The three films were hexene gas phase LLDPE films having a starting gauge of 0.6 mils and BURs of 2.0, 2.5, and 3.0, respectively. The intermeshing rolls used in comparative Example 1 had a 5.933" diameter, 0.100" pitch, 30 diametral pitch, and a 14½° pressure angle. The DOE to pitch ratio used to stretch the films varied from between 0 and 1.0. The MD tear resistance of these films was measured according to the methods and procedures set forth in ASTM D882-02. FIG. 2 is a chart that graphs the relationship between these films' MD tear resistance (y-axis) and the DOE to pitch ratio used to incrementally stretch the film in the machine direction (x-axis).

As shown by FIG. 2, the DOE to pitch ratio that produces a maintained or increased MD resistance to tear can be based at least on part on the BUR of the film. Specifically, DOE to pitch ratios between about 0.40 and 1.0 maintained or increased the MD tear resistance in the film produced with a 2.0 BUR. DOE to pitch ratios between about 0.80 and 1.0 maintained or increased the MD tear resistance in the film produced with a 2.5 BUR. On the other hand, none of DOE to pitch ratios maintained or increased the MD tear resistance of the film produced with a 3.0 BUR.

Comparative Example 2

Figure 3:
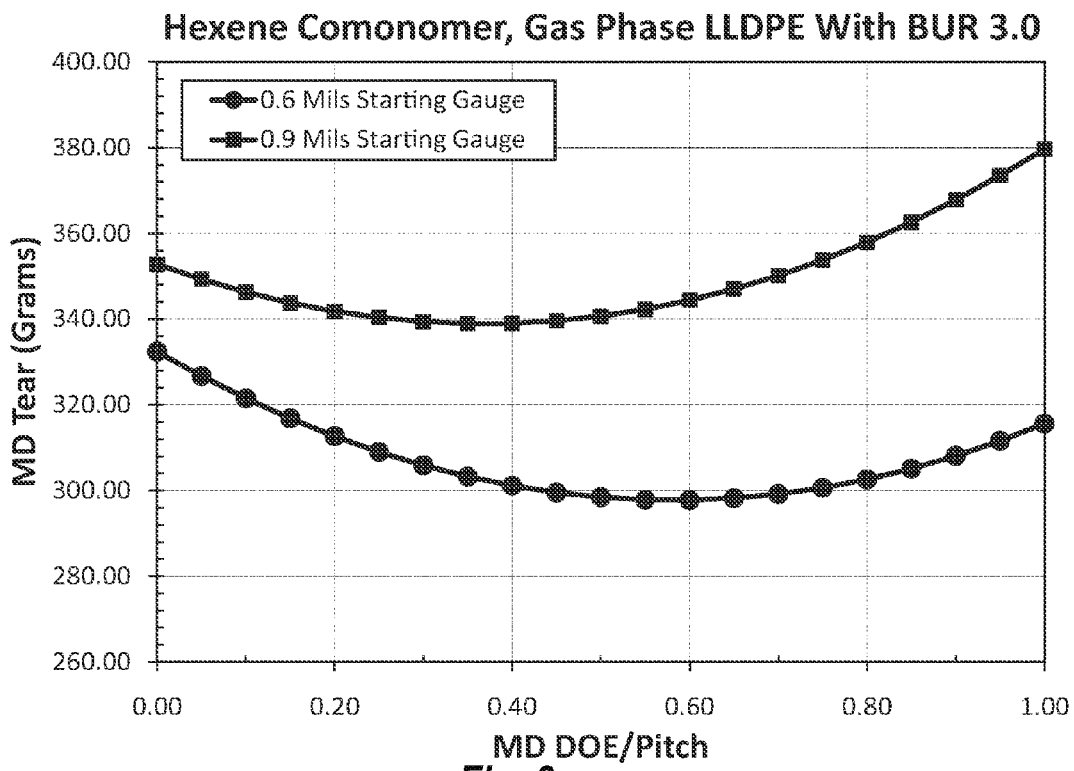
FIG. 3 is a chart that graphs, for two specific thermoplastic films having different starting gauges, the relationship between the ratio of depth-of-engagement to pitch and MD tear resistance in accordance with one or more implementations of the present invention.

In a second comparative example, a first thermoplastic film and a second thermoplastic film were MD incrementally stretched using a cold MD ring rolling process similar to that described herein above. The intermeshing rolls used in comparative Example 2 had a 5.933" diameter, 0.100" pitch, 30 diametral pitch, and a 14½° pressure angle. The DOE to pitch ratio used to stretch the films varied from between 0 and 1.0. The first thermoplastic film was a mono-layer hexene gas phase LLDPE film having a starting gauge of 0.6 mils and a BUR of 3.0. The second thermoplastic film was a mono-layer hexene gas phase LLDPE film having a starting gauge of 0.9 mils and a BUR of 3.0. The MD tear resistance of these stretched films was then measured according to the methods and procedures set forth in ASTM D882-02. FIG. 3 is a chart that graphs the relationship between these films' MD tear resistance (y-axis) and the DOE to pitch ratio used to incrementally stretch the film in the machine direction (x-axis).

As shown by FIG. 3, the DOE to pitch ratio that maintains or increases the MD tear resistance can be based at least on part on the starting gauge of the film. Specifically, DOE to pitch ratios between about 0.75 and 1.0 maintained or increased the MD tear resistance in the film with a 0.9 mils starting gauge. On the other hand, none of DOE to pitch ratios maintained or increased the MD tear resistance of the film produced with a 0.6 mils starting gauge.

Comparative Example 3

Figure 4:
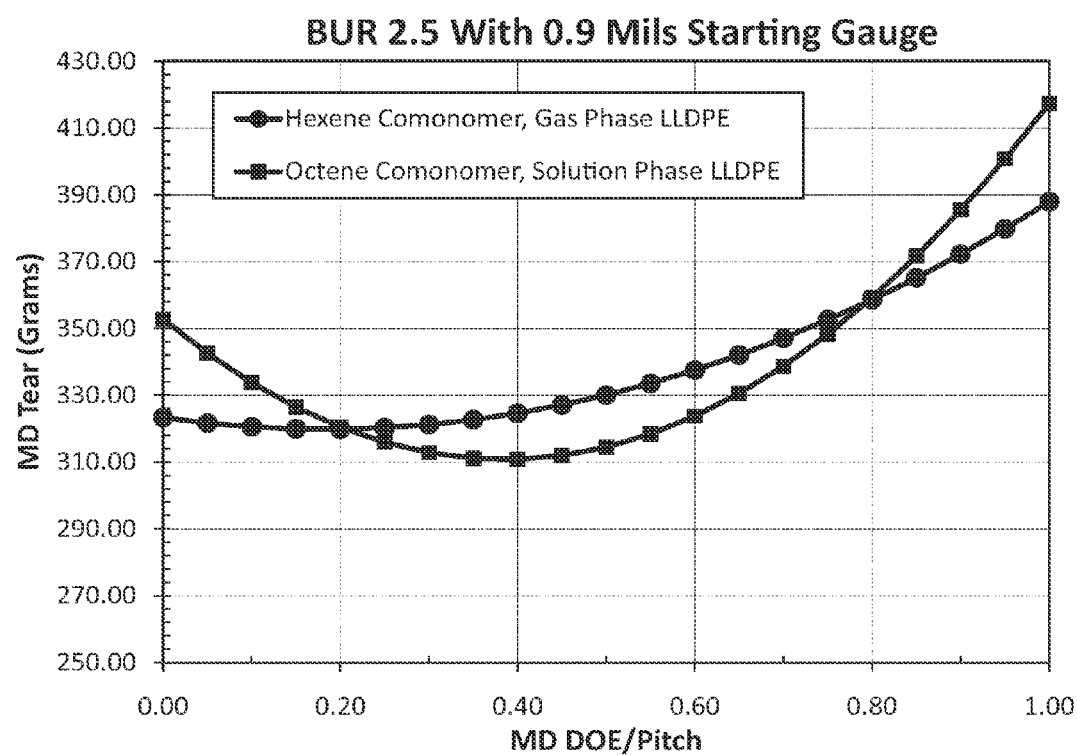
FIG. 4 is a chart that graphs, for two specific thermoplastic films of different thermoplastic material, the relationship between the ratio of depth-of-engagement to pitch and MD tear resistance in accordance with one or more implementations of the present invention.

In a third comparative example, a first thermoplastic film and a second thermoplastic film were MD incrementally stretched using a cold MD ring rolling process similar to that described herein above. The intermeshing rolls used in comparative Example 2 had a 5.933" diameter, 0.100" pitch, 30 diametral pitch, and a 14½° pressure angle. The DOE to pitch ratio used to stretch the films varied from between 0 and 1.0. The first thermoplastic film was a mono-layer hexene gas phase LLDPE film having a starting gauge of 0.9 mils and a BUR of 2.5. The second thermoplastic film was a mono-layer octene comonomer, solution phase LLDPE film having a starting gauge of 0.9 mils and a BUR of 2.5. The MD tear resistance of these stretched films was then measured according to the methods and procedures set forth in ASTM D882-02. FIG. 4 is a chart that graphs the relationship between these films' MD tear resistance (y-axis) and the DOE to pitch ratio used to incrementally stretch the film in the machine direction (x-axis).

As shown by FIG. 4, the DOE to pitch ratio that maintains or increases the MD tear resistance can be based at least on part on the thermoplastic material of the film. Specifically, DOE to pitch ratios between about 0.35 and 1.0 maintained or increased the MD tear resistance in the hexene gas phase LLDPE film. On the other hand, DOE to pitch ratios between about 0.75 and 1.0 maintained or increased the MD tear resistance in the octene comonomer, solution phase LLDPE film.

Example 4

In a fourth example, a two-layered thermoplastic film was MD incrementally stretched using a cold MD ring rolling process similar to that described herein above. The intermeshing rolls used in comparative Example 4 had a 5.933" diameter, 0.100" pitch, 30 diametral pitch, and a 14½° pressure angle. The films were hexene gas phase LLDPE films having a starting gauge of 1.1 mils and a BUR of 2.0. The films were run through the MD ring rolling process at a line speed of 300 feet per minute. The DOE to pitch ratio used to stretch the films varied from between 0 and 1.0. The thermoplastic film was MD incrementally stretched with four different DOEs. Specifically, the film was MD incrementally stretched at DOEs of 25 mils, 50 mils, 75 mils, and 100 mils. Table I lists the physical properties of these films along with the physical properties of a control film (i.e., the same film prior to stretching).

Table I

| | Physical Properties | | | |
|---|---|---|---|---|
| MD DOE (mils) | MD Tear (grams) | TD Tear (grams) | Dynatup Energy to max. load (In-Lb$_f$) | Gauge by Weight (GBW) (grams) |
| 0 | 312 | 932 | 5.63 | 1.069 |
| 25 | 308 | 867 | 7.01 | 1.132 |

Table I-continued

| | | Physical Properties | | |
|---|---|---|---|---|
| MD DOE (mils) | MD Tear (grams) | TD Tear (grams) | Dynatup Energy to max. load (In-Lb$_f$) | Gauge by Weight (GBW) (grams) |
| 50 | 380 | 905 | 6.60 | 1.081 |
| 75 | 380 | 973 | 4.05 | 1.038 |
| 100 | 502 | 972 | 4.58 | 0.962 |

The results from Table I indicate that the bi-layer MD incrementally stretched film under certain conditions can have a maintained or increased MD tear resistance. Specifically, in some instances the increase in MD tear resistance can be as great as 1.6 times the pre-stretched film. Furthermore, Table I has indicates that the TD tear resistance of the MD incrementally stretched can also increase under certain conditions. Furthermore, Table I indicates that the energy to maximum load (Dynatup Max), which relates to impact resistance, may not be significantly decreased under certain conditions.

Table I further illustrates that the incrementally stretched films can include a maintained or increased MD tear resistance despite a reduction in gauge. One will appreciate in light of the disclosure herein that this is an unexpected result, as MD tear is expected to decrease as the gauge of the film decreases. For example, Table I illustrates that the un-stretched film (0 MD DOE) can have a MD tear resistance to GBW ratio of 291.86. While films processed according to one or more implementations of the present invention can include an MD tear resistance to GBW ratio as large as 1.8 times the pre- or un-stretched film. One or more implementations of the present inventions include incrementally stretched films with MD tear resistance to GBW ratios between about 1 and about 2 times greater than the pre- or un-stretched film. More particularly, one or more implementations of the present inventions include incrementally stretched films with MD tear resistance to GBW ratios between about 1.2 and about 1.8 times greater than the pre- or un-stretched film.

One will appreciate in light of the disclosure herein that the MD incrementally-stretched films with maintained or increased MD tear resistance can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include MD incrementally-stretched with maintained or increased MD tear resistance to one extent or another. Trash bags and food storage bags may be particularly benefited by the films of the present invention.

Figure 5:
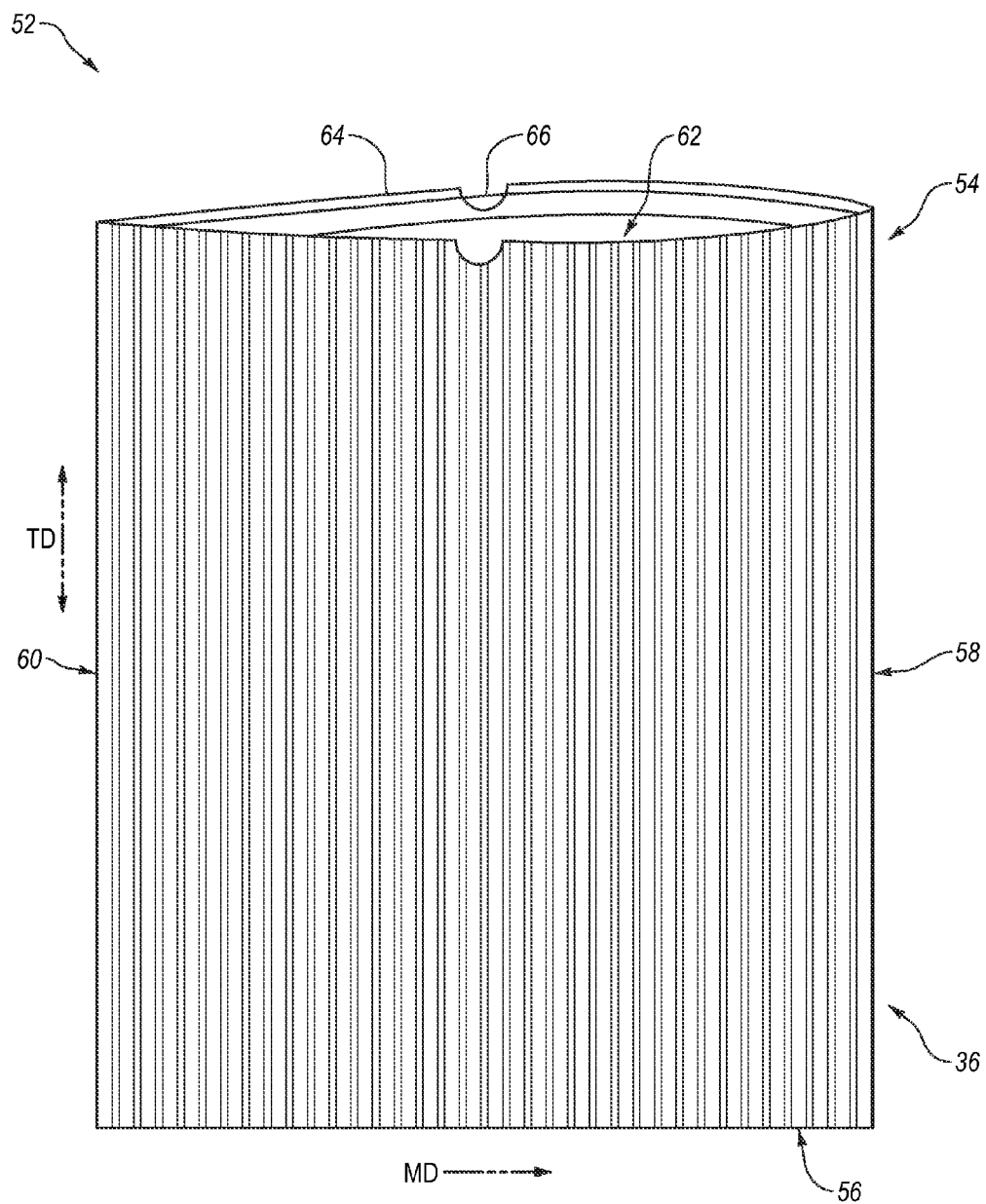
FIG. 5 illustrates a bag incorporating an MD incrementally stretched film in accordance with one or more implementations of the present invention.

Referring to FIG. 5, in a particular implementation of the present invention, the MD incrementally-stretched film 10b illustrated in FIGS. 1A-1B may be incorporated in a bag construction, such as a flexible draw tape bag 52. The bag 52 can include a bag body 54 formed from a piece of MD incrementally-stretched film 10b folded upon itself along a bag bottom 56. Side seams 58 and 60 can bond the sides of the bag body 54 together to form a semi-enclosed container having an opening 62 along an upper edge 64. The bag 52 also optionally includes closure means 66 located adjacent to the upper edge 64 for sealing the top of the bag 52 to form a fully-enclosed container or vessel. The bag 52 is suitable for containing and protecting a wide variety of materials and/or objects. The closure means 66 can comprise flaps, adhesive tapes, a tuck and fold closure, an interlocking closure, a slider closure, a zipper closure or other closure structures known to those skilled in the art for closing a bag.

As shown, the sides of the bag body 54 can include a ribbed pattern 36. The ribbed pattern 36 can include alternating series of thicker ribs and thinner ribs. The ribs can extend across the bag 52 in the TD direction, or in other words, from the bag bottom 56 to the upper edge 64. The bag 52 can require less material to form than an identical bag formed with an un-stretched film 10a of the same thermoplastic material. Additionally, despite requiring less material, the bag 52 can have the same or greater MD tear resistance than an identical bag formed with an un-stretched film 10a of the same thermoplastic material. The maintained or increased MD tear resistance can help prevent the bag 52 from tearing and losing the contents therein.

Figure 6:
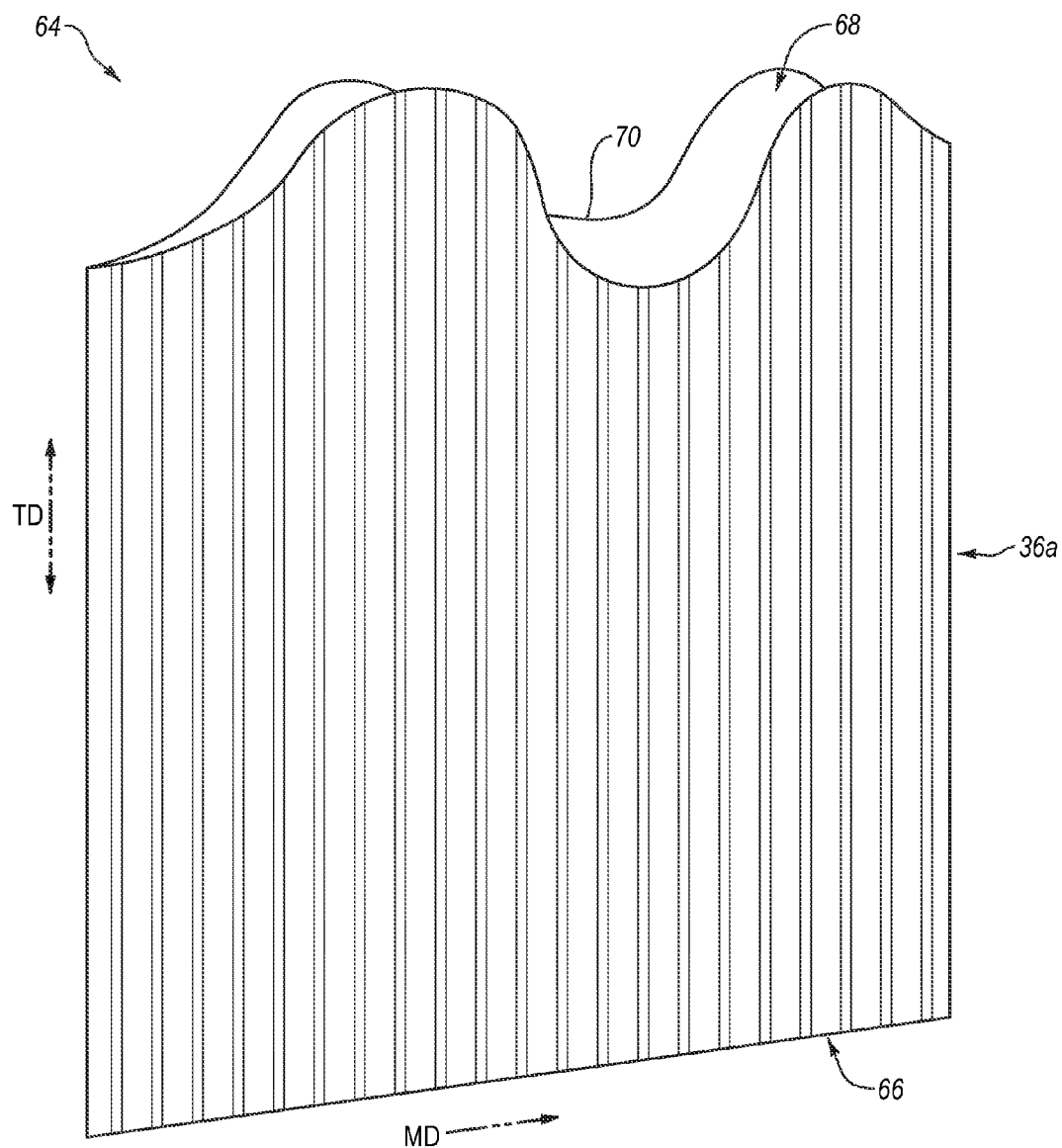
FIG. 6 illustrates another bag incorporating an MD incrementally stretched film in accordance with one or more implementations of the present invention.

FIG. 6 illustrates a tie bag 64 incorporating an MD incrementally-stretched film in accordance with an implementation of the present invention. As shown the sides of the tie bag 64 can include a ribbed pattern 36a. The ribbed pattern 36a can include alternating series of thicker ribs and thinner ribs. The ribs can extend across the bag 64 in the transverse direction, or in other 64 words from the bag bottom 66 to the flaps 68 of the upper edge 70.

In comparison with the bag 52 of FIG. 5, the thinner and thicker ribs of the tie bag 64 can have greater widths. The use of intermeshing rollers with greater ridge pitch can create thinner and thicker ribs with greater widths. Thus, one will appreciate in light of the disclosure herein that a manufacturer can vary the ridge pitch of the intermeshing rollers to vary the imparted ribbed pattern, and thus, the aesthetic of the MD incrementally-stretched film.

Figure 7:
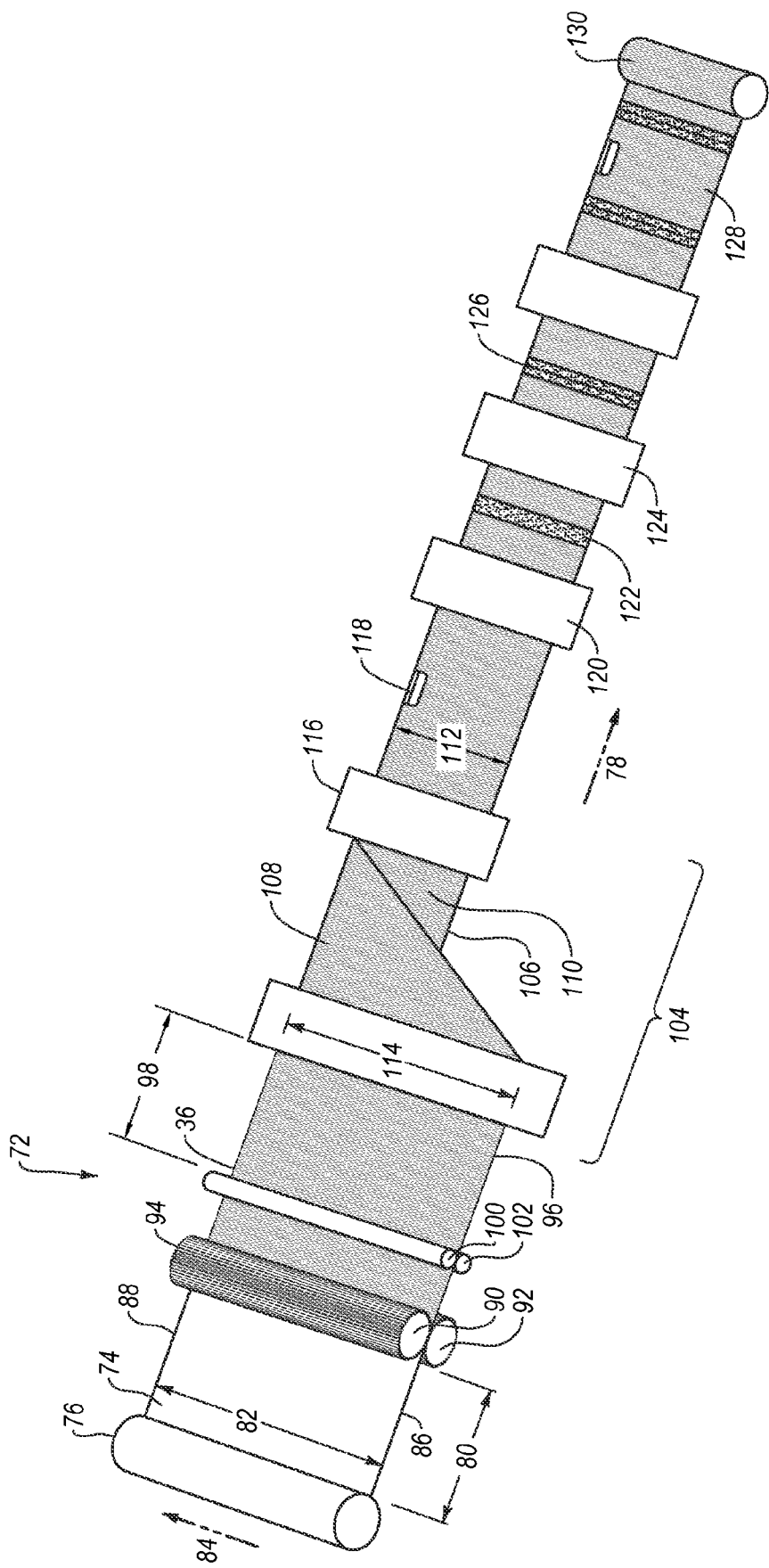
FIG. 7 illustrates a schematic diagram of a bag manufacturing process in accordance with one or more implementations of the present invention.

FIG. 7 illustrates an exemplary embodiment of a high-speed manufacturing process 72 for incrementally stretching a thermoplastic film in the machine direction and producing a plastic bag there from. According to the process, an un-stretched thermoplastic film 74 is unwound from a roll 76 and directed along a machine direction 78. The un-stretched film 74 can have a portion of a first length 80 in the machine direction 78 and a first width 82 in the transverse direction 84. The first width is measured between a first edge 86 and a parallel second edge 88.

The un-stretched film 74 can pass between first and second cylindrical intermeshing rollers 90, 92 to incrementally stretch the un-stretched film 74 in the machine direction 78 and impart a ribbed pattern 36 thereon. The rollers 90, 92 can have a construction similar to that of intermeshing rollers 12, 14 of FIGS. 1A-1B. In particular, rollers 90, 92 can include a plurality of ridges 94 that extend the along the length of rollers 90, 92 in the transverse direction 84. The ridges 94 of the first roller 90 can fit between corresponding ridges of the second roller 92 in the manner described herein above in relation to intermeshing rollers 12, 14.

The rollers 90, 92 may be arranged so that their longitudinal axes are perpendicular to the machine direction 78. Additionally, the rollers 90, 92 may rotate about their longitudinal axes in opposite rotational directions. In various embodiments, motors may be provided that power rotation of the rollers 90, 92 in a controlled manner. As the un-stretched film 74 passes between the first and second rollers 90, 92, the ridges 94 of the intermeshing rollers 90, 92 can impart a ribbed pattern 36 and incrementally stretch the film, thereby creating an MD incrementally-stretched film 96. The aforementioned portion of the film 74 can have a second length 98 in the machine direction 78 that is longer than the first length 80 after passing through the intermeshing rollers 90, 92.

During the manufacturing process 72, the MD incrementally-stretched film 96 can also pass through a pair of pinch rollers 100, 102. The pinch rollers 100, 102 can be appropriately arranged to grasp the MD incrementally-stretched film 96. The pinch rollers 100, 102 may facilitate and accommodate the MD incrementally-stretched film 96.

A folding operation 104 can fold the MD incrementally-stretched film 96 to produce the sidewalls of the finished bag. The folding operation 104 can fold the MD incrementally-stretched film 96 in half along the transverse direction 84. In particular, the folding operation 104 can move the first edge 86 adjacent to the second edge 88, thereby creating a folded edge 106. The folding operation 104 thereby provides a first film half 108 and an adjacent second web half 110. The overall width 112 of the second film half 110 can be half the second width 114 of the MD incrementally-stretched film 96.

To produce the finished bag, the processing equipment may further process the folded MD incrementally-stretched film 96. In particular, a draw tape operation 116 can insert a draw tape 118 into the incrementally-stretched film 96. Furthermore, a sealing operation 120 can form the parallel side edges of the finished bag by forming heat seals 122 between adjacent portions of the folded MD incrementally-stretched film 96. The heat seals 122 may be spaced apart along the folded MD incrementally-stretched film 96. The sealing operation 120 can form the heat seals 122 using a heating device, such as, a heated knife.

A perforating operation 124 may form a perforation 126 in the heat seals 122 using a perforating device, such as, a perforating knife. The perforations 126 in conjunction with the folded outer edge 106 can define individual bags 128 that may be separated from the MD incrementally-stretched film 96. A roll 130 can wind the MD incrementally-stretched film 96 embodying the finished bags 128 for packaging and distribution. For example, the roll 130 may be placed into a box or bag for sale to a customer.

Figure 8:
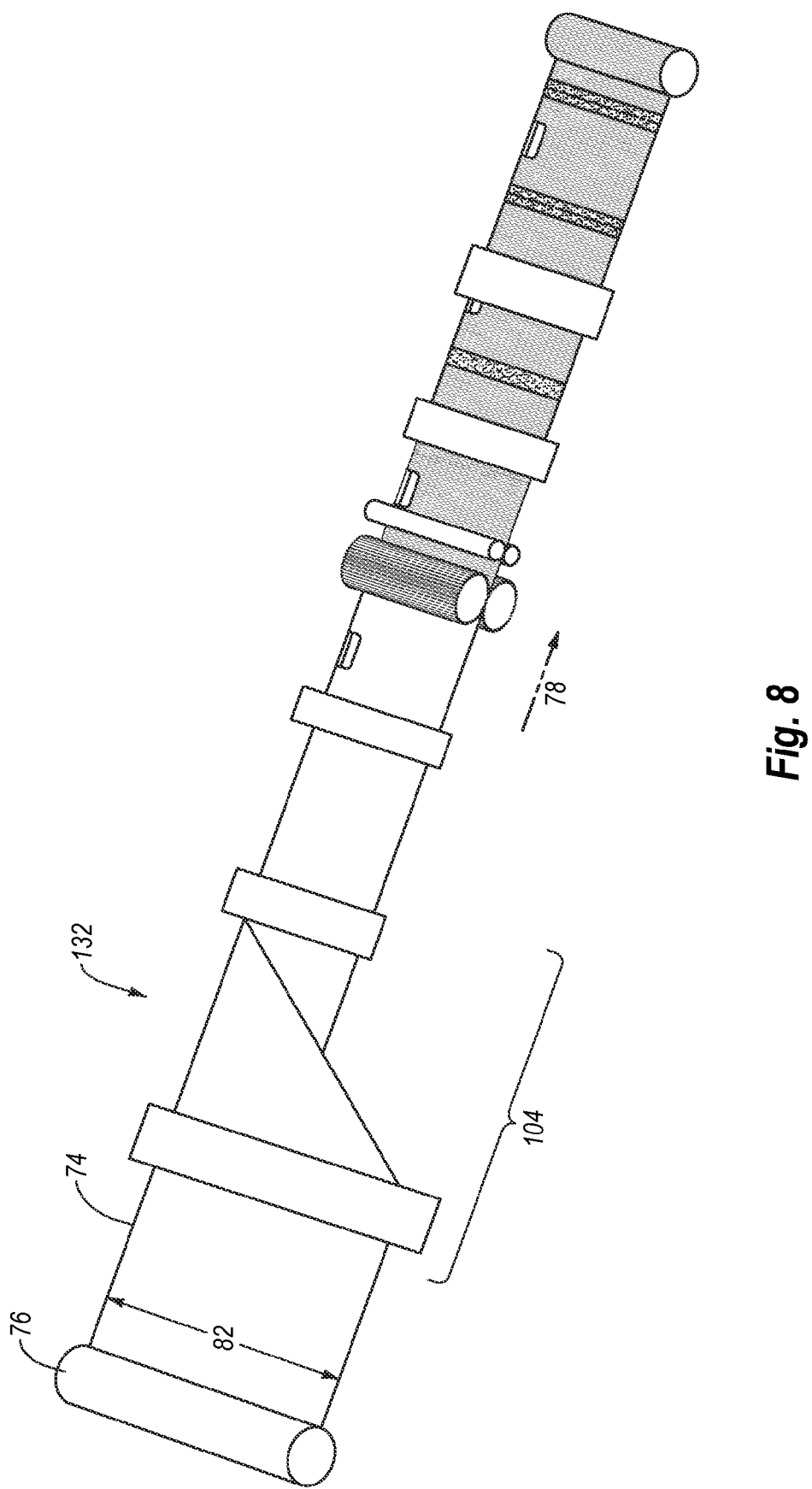
FIG. 8 illustrates a schematic diagram of another bag manufacturing process in accordance with one or more implementations of the present invention.

One will appreciate in light of the disclosure herein that the process 72 described in relation to FIG. 7 can be modified to omit or expanded acts, or vary the order of the various acts as desired. For example, FIG. 8 illustrates another manufacturing process 132 for producing a plastic bag having a ribbed pattern imparted therein. The process 132 can be similar to process 72 of FIG. 6, except that the un-stretched film 74 is stretched after the folding operation 104 has folded it in half. In yet additional implementations, the un-stretched film 74 can be folded prior to winding it on the roll 76. Thus, in such implementations, the film 74 unwound from the roll 76 is already folded.

In still further implementations, folded MD incrementally-stretched film 96 may be cut into individual bags along the heat seals 122 by a cutting operation. In another implementation, the folded MD incrementally-stretched film 96 may be folded one or more times prior to the cutting operation. In yet another implementation, the side sealing operation 120 may be combined with the cutting and/or perforation operations 124.

Implementations of the present invention can also include methods of incrementally stretching a film of thermoplastic material in the machine direction without reducing the machine-direction tear resistance of the film. The following describes at least one implementation of a method with reference to the components and diagrams of FIGS. 1A through 8. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For example, one method in accordance with one or more implementations of the present invention can include providing a film of thermoplastic material 10. For example, the method can involve extruding a film 10 and directing the film 10 into a high speed manufacturing system. The film 10 of thermoplastic material can have a first MD tear resistance. In some implementations, the film 10 can have a substantially uniform starting gauge 42.

The method can also include cold stretching the film 10a incrementally in the machine direction. In one or more implementations this can involve imparting a pattern 36 of alternating thick 44 and thin ribs 46 into the film 10. For example, the method can involve MD ring rolling the film 10. More specifically, the method can involve passing the film 10 through intermeshing rollers 12, 14. As the film 10 passes through the intermeshing rollers 12, 14, ridges 24, 26 extending in the transverse direction can impart the pattern 36 into the film and incrementally stretch the film 10 in the machine direction.

The method can also include selecting an MD DOE to pitch ratio of the intermeshing rollers 12, 14 based on one or more material properties of the film 10. For example, the method can involve selecting an MD DOE to pitch ratio based on a starting gauge 42 of the film 10. Additionally or alternatively, the method can involve selecting an MD DOE to pitch ratio based on a BUR used to form the film 10. Optionally, the method can also involve selecting an MD DOE to pitch ratio based on the thermoplastic material of the film 10. In any event, the incrementally cold stretched film 10b can have a second machine-direction tear resistance that is equal to or greater than the first machine-direction tear resistance.

Accordingly, FIGS. 1A-8 and the corresponding text, therefore, specifically show, describe, or otherwise provide a number of systems, components, apparatus, and methods for stretching a film in the machine direction. These apparatus and methods can stretch films as discussed that, at the very least, avoid, reducing the film's MD tear resistance. There are several advantages associated with MD incrementally stretching a thermoplastic film in accordance with one or more implementations of the present invention. First, MD incrementally stretching a film can reduce the amount of thermoplastic material needed to produce a film of certain dimensions. Manufacturers can decrease the cost of their products if they use less thermoplastic material in their products. Depending on the amount that a film is stretched, this cost savings can be significant.

Second, the ribbed pattern 36 that is imparted onto an incrementally stretched film 10b can make the film feel more durable to consumers. This can be important because consumers of products made in whole or in part from a thermoplastic film often associate the strength of a film with its feel. If a film feels thin or insubstantial, consumers may believe that the film is weak and fragile.

Third, if a thermoplastic film is incrementally stretched in the machine direction in accordance with the present invention, the film's MD tear resistance can be maintained or even increased. This finding is unexpected, as it is generally understood that MD stretching a thermoplastic film will decrease the film's MD resistance to tear (i.e., make the film more susceptible to MD tear). Indeed, in one or more implementations the MD tear resistance of a thermoplastic film can be maintained or increased despite the reduction in gauge. In one or more implementations, the MD tear resistance of the MD incrementally-stretched film 10b can be approximately equal to the MD tear resistance of the pre-stretched film 10a.

In alternative implementations, the MD tear resistance of the MD incrementally-stretched film 10b can be greater than the MD tear resistance of the pre-stretched film 10a. More specifically, the MD tear resistance of the MD incrementally-stretched film 10b can be approximately 1.0 to approximately 2.0 times greater than the MD tear resistance of the pre-stretched film 10a. In further implementations, the MD tear resistance of the MD incrementally-stretched film 10b can be approximately 1.1 to about 1.6 times greater than the MD tear resistance of the pre-stretched film 10a.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A machine-direction incrementally-stretched film of thermoplastic material comprising:
    a set of linear ribs extending across the film in a direction transverse to a direction in which the film was extruded, the linear ribs each having a first average thickness; and
    a set of stretched linear sections extending across the film in the transverse direction, the stretched linear sections each being positioned between adjacent linear ribs, the stretched linear sections each having a second average thickness that is smaller than the first average thickness;
    wherein the film has:
        a gauge-by-weight that is from 10.0% smaller than to 5.9% larger than a gauge-by-weight of a film of the thermoplastic material having a substantially uniform thickness equal to the first average thickness; and
        a machine direction tear resistance that is equal to or greater than a machine direction tear resistance of the film of the thermoplastic material having the substantially uniform thickness equal to the first average thickness.

2. The film as recited in claim 1, wherein first average thickness is less than 1.25 mils.

3. The film as recited in claim 1, wherein the thermoplastic material comprises polyethylene.

4. The film as recited in claim 3, wherein the thermoplastic material comprises linear low density polyethylene.

5. The film as recited in claim 1, wherein the thermoplastic material comprises polypropylene.

6. The thermoplastic film as recited in claim 1, wherein the machine direction tear resistance of the film is greater than the machine direction tear resistance of a film of the thermoplastic material having a substantially uniform thickness equal to the first average thickness.

7. The thermoplastic film as recited in claim 1, wherein the machine direction tear resistance of the film is between 1.1 times and 1.6 times greater than the machine direction tear resistance of a film of the thermoplastic material having a substantially uniform thickness equal to the first average thickness.

8. The thermoplastic film as recited in claim 1, wherein the film is formed into a bag.

9. The thermoplastic film as recited in claim 8, wherein the set of linear ribs and the set of stretched linear sections extend from a bottom of the bag to an opening of the bag.

10. The thermoplastic film as recited in claim 1, wherein the film has a machine direction tear resistance to gauge by weight ratio between 1.0 and 2.0 times greater than a machine direction tear resistance to gauge by weight ratio of the film of the thermoplastic material having a substantially uniform thickness equal to the first average thickness.

11. The thermoplastic film as recited in claim 7, wherein the machine direction tear resistance of the film is between 1.1 and 1.6 times greater than the machine direction tear resistance of the film of the thermoplastic material having a substantially uniform thickness equal to the first average thickness.

12. The thermoplastic film as recited in claim 11, further comprising a transverse direction tear resistance that is equal to or greater than a transverse direction tear resistance of the film of the thermoplastic material having the substantially uniform thickness equal to the first average thickness.

13. The thermoplastic film as recited in claim 11, having a gauge by weight that is less than a gauge by weight of the film of the thermoplastic material having a substantially uniform thickness equal to the first average thickness.

14. The incrementally-stretched thermoplastic film as recited in claim 11, wherein the incrementally-stretched thermoplastic film comprises polyethylene.

15. An incrementally-stretched thermoplastic film formed by stretching an un-incrementally-stretched thermoplastic film comprising:
    a set of thicker linear ribs extending across the incrementally-stretched thermoplastic film in a direction transverse to a direction in which the incrementally-stretched thermoplastic film was extruded;
    a set of thinner, stretched linear sections extending across the incrementally-stretched thermoplastic film in the direction transverse to the direction in which the incrementally-stretched thermoplastic film was extruded, wherein the thinner, stretched linear sections alternate with the thicker linear ribs;
    a machine direction tear resistance that is greater than a first machine direction tear resistance of the un-incrementally-stretched thermoplastic film; and
    a gauge by weight that is lesser than a first gauge by weight of the un-incrementally-stretched thermoplastic film, the gauge by weight being from 10% smaller than to equal to the first gauge by weight.

16. The incrementally-stretched thermoplastic film as recited in claim 15, wherein the gauge by weight of the incrementally-stretched thermoplastic film is 0.96 times the first gauge by weight of the un-incrementally-stretched thermoplastic film.

17. The incrementally-stretched thermoplastic film as recited in claim 16, wherein the machine direction tear resistance is between 1.1 and 1.6 times the first machine direction tear resistance of the un-incrementally-stretched thermoplastic film.

18. The incrementally-stretched thermoplastic film as recited in claim 17, wherein the machine direction tear resistance is 1.6 times the first machine direction tear resistance of the un-incrementally-stretched thermoplastic film.

19. The incrementally-stretched thermoplastic film as recited in claim 17, wherein the incrementally-stretched thermoplastic film has a machine direction tear resistance to gauge by weight ratio between 1.0 and 2.0 times greater than a first machine direction tear resistance to gauge by weight ratio of the un-incrementally-stretched thermoplastic film.

20. The incrementally-stretched thermoplastic film as recited in claim 15, further comprising a transverse direction tear resistance that is greater than a first transverse direction tear resistance of the un-incrementally-stretched thermoplastic film.

21. The film incrementally-stretched thermoplastic film as recited in claim 15, wherein the incrementally-stretched thermoplastic film comprises linear low density polyethylene.

22. The incrementally-stretched thermoplastic film as recited in claim 15, wherein the incrementally-stretched thermoplastic film comprises polypropylene.

23. The incrementally-stretched thermoplastic film as recited in claim 15, wherein the incrementally-stretched thermoplastic film is formed into a bag.

24. The incrementally-stretched thermoplastic film as recited in claim 23, wherein the set of linear ribs and the set of stretched linear sections extend from a bottom of the bag to an opening of the bag.

\* \* \* \* \*